(12) United States Patent
Zhao et al.

(10) Patent No.: US 9,445,033 B2
(45) Date of Patent: Sep. 13, 2016

(54) METHOD FOR DETECTING ROTATION ANGLE OF REMOTE CONTROLLER IN TELEVISION SYSTEM AND TELEVISION SYSTEM

(71) Applicant: BOE TECHNOLOGY GROUP CO., LTD., Beijing (CN)

(72) Inventors: Xingxing Zhao, Beijing (CN); Xinxin Mu, Beijing (CN); Hong Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/648,000

(22) PCT Filed: Nov. 10, 2014

(86) PCT No.: PCT/CN2014/090742
§ 371 (c)(1),
(2) Date: May 28, 2015

(87) PCT Pub. No.: WO2015/101108
PCT Pub. Date: Jul. 9, 2015

(65) Prior Publication Data
US 2015/0373294 A1 Dec. 24, 2015

(30) Foreign Application Priority Data

Dec. 31, 2013 (CN) .......................... 2013 1 0752960

(51) Int. Cl.
*H04N 5/44* (2011.01)

(52) U.S. Cl.
CPC .... *H04N 5/4403* (2013.01); *H04N 2005/4423* (2013.01); *H04N 2005/4426* (2013.01); *H04N 2005/4428* (2013.01)

(58) Field of Classification Search
CPC ...... H04N 5/4403; H04N 5/44; H04N 5/445; H04N 5/217; H04N 5/225; H04N 5/232; H04N 5/2621; H04N 2005/4423; H04N 2005/4426; H04N 2005/4428; H04N 2005/4442; H04N 2005/4446; H04N 1/00496; H04N 1/0614; H04N 1/065; H04N 1/19552; H04N 1/3877; H04N 1/0032; H04N 1/00172
USPC ....... 348/734, 725, 723, 706, 801, 813, 636, 348/658, 680, 693, 583, 596, 333.06, 369, 348/208.8, 230.1, 237, 244, 249, 250, 294, 348/164, 180, 142, 37, 33; 345/156, 157, 345/158, 159, 160, 161, 164, 165, 169, 345/183; 382/103, 106, 296, 297
See application file for complete search history.

(56) References Cited

U.S. PATENT DOCUMENTS 5,926,168 A * 7/1999 Fan ....................... G06F 3/0325
345/158
6,556,412 B1 * 4/2003 Oh .......................... H04N 9/29
348/E9.023

(Continued)

FOREIGN PATENT DOCUMENTS

| CN | 1787605 A | 6/2006 |
| CN | 101290711 A | 10/2008 |

(Continued)

OTHER PUBLICATIONS

International Search Report of PCT/CN2014/090742 in Chinese, mailed Feb. 11, 2015 with English translation.

(Continued)

*Primary Examiner* — Jefferey Harold
*Assistant Examiner* — Mustafizur Rahman
(74) *Attorney, Agent, or Firm* — Collard & Roe, P.C.

(57) ABSTRACT

There is provided a method for detecting a rotation angle of a remote controller(21) in a television system(30,40) in order to realize a detection for the rotation angle of the remote controller(21) with respect to the television(20), which extends an application prospect of the television system. The television system (30,40) includes a television (20) and a remote controller (21), and the method comprises: collecting(S101), by the remote controller (21), an image of preset infrared sensors on the television (20) and imaging the collected image to a preset plane as a standard image, in a case in which the remote controller(21) does not rotate with respect to the television(20); collecting(S102), by the remote controller(21), an image of the infrared sensors on the television(20) and imaging the collected image to the preset plane again, in a case in which the remote controller (21) rotates with respect to the television(20); and calculating(S103) a rotation angle in a case in which the remote controller(21) rotates with respect to a screen of the television(20) by comparing the image with the standard image. There is further provided a television system(30,40).

20 Claims, 5 Drawing Sheets

(56) References Cited

U.S. PATENT DOCUMENTS

| | | | |
|---|---|---|---|
| 6,724,368 B2* | 4/2004 | Strubbe | G06F 3/0304 345/156 |
| 8,035,756 B1* | 10/2011 | Grove | H04N 21/42204 348/734 |
| 8,345,002 B2* | 1/2013 | Lin | G06F 3/0346 178/19.05 |
| 8,400,474 B2* | 3/2013 | Yoshida | G06F 3/0346 345/156 |
| 8,773,531 B2* | 7/2014 | Kim | G06F 3/0346 348/131 |
| 8,917,241 B2* | 12/2014 | Hsieh | G06F 3/0346 345/157 |
| 2007/0080940 A1* | 4/2007 | Aoki | G06F 3/0304 345/158 |
| 2008/0151125 A1* | 6/2008 | Bucchieri | G06F 3/0346 348/734 |
| 2008/0285779 A1* | 11/2008 | Naito | H04N 21/42221 381/306 |
| 2010/0053467 A1* | 3/2010 | Maxson | H04B 10/1141 348/734 |
| 2010/0103099 A1* | 4/2010 | Lee | G06F 3/0317 345/158 |
| 2010/0201618 A1* | 8/2010 | Lorente | G06F 1/1626 345/157 |
| 2010/0231511 A1 | 9/2010 | Henty et al. | |
| 2011/0163952 A1* | 7/2011 | Hong | G06F 3/0346 345/157 |
| 2012/0113001 A1* | 5/2012 | Yamauchi | G06F 3/038 345/157 |
| 2012/0206350 A1* | 8/2012 | Figaro | G06F 3/038 345/158 |
| 2013/0093675 A1 | 4/2013 | Lin et al. | |
| 2013/0300660 A1* | 11/2013 | Chao | G06F 3/0346 345/158 |
| 2014/0043542 A1* | 2/2014 | Wang | H04N 5/4403 348/734 |

FOREIGN PATENT DOCUMENTS

| | | |
|---|---|---|
| CN | 201191341 Y | 2/2009 |
| CN | 201499231 U | 6/2010 |
| CN | 102289304 A | 12/2011 |
| CN | 202222024 U | 5/2012 |
| CN | 102495674 A | 6/2012 |
| CN | 103076926 A | 5/2013 |
| CN | 103727899 A | 4/2014 |
| TW | 201305854 A | 2/2013 |

OTHER PUBLICATIONS

Notice of Transmittal of the International Search Report of PCT/CN2014/090742 in Chinese, mailed Feb. 11, 2015.
Written Opinion of the International Searching Authority of PCT/CN2014/090742 in Chinese, mailed Feb. 11, 2015 with English translation.
First Chinese Office Action in Chinese Application No. 201310752960.9 mailed Aug. 28, 2014 with English translation.
Second Chinese Office Action in Chinese Application No. 201310752960.9 mailed Feb. 6, 2015 with English translation.
Patent Certificate for Chinese Application No. 201310752960.9 issued Jul. 1, 2015.

* cited by examiner

METHOD FOR DETECTING ROTATION ANGLE OF REMOTE CONTROLLER IN TELEVISION SYSTEM AND TELEVISION SYSTEM

CROSS REFERENCE TO RELATED APPLICATIONS

This application is the National Stage of PCT/CN2014/090742 filed on Nov. 10, 2014, which claims priority under 35 U.S.C. §119 of Chinese Application No. 201310752960.9 filed on Dec. 31, 2013, the disclosure of which is incorporated by reference.

TECHNICAL FIELD

The present disclosure relates to a field of display technique, and more particular, to a method for detecting a rotation angle of a remote controller in a television system and the television system.

BACKGROUND

An existing remote controller, for example, for a game machine, has a pointing-direction location function. In one of known solutions, an infrared sensor(s) is disposed at a corner(s) of a television, wherein the infrared sensor can be an infrared Light Emitting Diode (LED). A camera in the remote controller may collect images from the infrared sensor disposed at the corner of the television and forms the collected image on a preset plane; a data processing unit in the remote controller may calculate a position to which the remote controller points, an angle between the pointing-direction of the remote controller and a screen of the television and a distance between the remote controller and the screen of the television, by means of the image on the preset plane; a data transferring unit in the remote controller transfers a result(s) calculated by the data processing unit to the television, in order to realize a determination for the position to which the remote controller points, the angle between the pointing-direction of the remote controller and the screen of the television and the distance between the remote controller and the screen of the television. In a case in which the number of the infrared sensors disposed at the corners of the television is two or three, the television can only locate the position to which the remote controller points, and there are required four infrared sensors to be disposed at the corners of the television if the television is desired to detect the angle between the pointing-direction of the remote controller and the screen of the television and the distance between the remote controller and the screen of the television.

In summary, this known solution fails to mention a detection for a rotation angle of the remote controller by the television, and at the same time, at least four infrared sensors are required to be disposed at the corners of the television in order to realize the detections, by the television, for the position to which the remote controller points, the angle between the pointing-direction of the remote controller and the screen of the television, and the distance between the remote controller and the screen of the television.

SUMMARY

Embodiments of the present disclosure provide a method for detecting a rotation angle of a remote controller in a television system and the television system, in order to realize detection for the rotation angle of the remote controller with respect to the television, which extends an application prospect of the television system.

According to a method for detecting a rotation angle of a remote controller in a television system, including a television and the remote controller, provided in the embodiments of the present disclosure, the method comprises:

collecting, by the remote controller, an image of preset infrared sensors on the television and imaging the collected image to a preset plane as a standard image, in a case in which the remote controller does not rotate with respect to the television;

collecting, by the remote controller, an image of the infrared sensors on the television and imaging the collected image to the preset plane again, in a case in which the remote controller rotates with respect to the television; and calculating a rotation angle by comparing the image with the standard image in a case in which the remote controller rotates with respect to a screen of the television.

With the method for detecting the rotation angle of the remote controller in the television system provided in the embodiments of the present disclosure, the rotation angle in a case in which the remote controller rotates with respect to the screen of the television can be calculated easily according to the position of image of the infrared sensors in the preset plane.

Optionally, the remote controller transmits the imaged image to the television, the television compares the image with the standard image and calculates the rotation angle in a case in which the remote controller rotates with respect to the screen of the television.

Optionally, the remote controller compares the image with the standard image and calculates the rotation angle in a case in which the remote controller rotates with respect to the television.

Optionally, the method further comprises: transmitting, by the remote controller, the obtained rotation angle to the television.

Thus, the detection for the rotation angle of the remote controller with respect to the television is realized by transmitting the obtained rotation angle to the television from the remote controller, which can indicate a rotation operation in a game easily.

Optionally, the preset infrared sensors on the television comprise:

infrared sensors disposed at corners of a diagonal of the light-guide plate (LGP) in the television and on the side(s) without a light bar;

disposed at the corners of a light bar and along a diagonal of the LGP in the television;

infrared sensors disposed at corners on a shell of the television corresponding to the corners of a display screen.

Thus, in a case in which the infrared sensors are disposed at corners of a diagonal of the light-guide plate (LGP) in the television and on the side(s) without a light bar or disposed at the corners of the light bar and along the diagonal of the LGP in the television, it is convenient and simple in a design for the television system and is easy to be implemented. Also, an infrared spot in the infrared sensors disposed at the corners of the diagonal of the LGP in the television and on the side(s) without light bar(s) or disposed at the corners of the light bar and along the diagonal of the LGP in the television is diffused through the LGP and projected passing through the plate, which can reduce a volume of the infrared sensor accessories.

Optionally, the number of the infrared sensors disposed at the corners of the diagonals of the LGP in the television and on the side(s) without the light bars or disposed at the corners of the light bars and along the diagonal of the LGP in the television is two.

Thus, in a case in which the infrared sensors are disposed at the corners of the diagonals of the LGP in the television and on the side(s) without the light bars or disposed at the corners of the light bars and along the diagonal of the LGP in the television, only two infrared sensors are required to realize an accurate detection for the rotation angle of the remote controller by the television, and can also realize accurate detections, by the television, for the position to which the remote controller points, the angle between the pointing-direction of the remote controller and the screen of the television, and the distance between the remote controller and the screen of the television, which reduces the number of the infrared sensor accessories.

Optionally, the number of the infrared sensors disposed at corners on the shell of the television corresponding to the corners of a display screen is two, three or four.

The embodiments of the present disclosure further provide a television system including a television and a remote controller, the remote controller comprises:

an image collection unit configured to collect an image of preset infrared sensors on the television and image the collected image to a preset plane as a standard image, in a case in which the remote controller does not rotate with respect to the television; and to collect an image of the infrared sensors on the television and image the collected image to the preset plane again, in a case in which the remote controller rotates with respect to the television; and a transmitting unit configured to transmit the imaged image to the television, the television comprises:

a receiving unit configured to receive the imaged image transmitted from the transmitting unit of the remote controller;

a calculation unit configured to calculate a rotation angle in a case in which the remote controller rotates with respect to a screen of the television by comparing the image with the standard image.

With the television system provided in the embodiments of the present disclosure, the rotation angle in a case in which the remote controller rotates with respect to the screen of the television can be calculated easily, and the detection for the rotation angle of the remote controller with respect to the television is realized, which can indicate a rotation operation in a game easily.

Optionally, the infrared sensors are disposed at corners of diagonals of a light-guide plate (LGP) in the television and on the side(s) without light bar(s); or disposed at corners of a light bar and along a diagonal of the LGP in the television; or disposed at corners on a shell of the television corresponding to the corners of a display screen.

Thus, in a case in which the infrared sensors are disposed at the corners of the diagonals of the LGP in the television and on the side(s) without the light bars or disposed at the corners of the light bar and along the diagonal of the LGP in the television or disposed at corners on the shell of the television, it is convenient and simple in a design for the television system and is easy to be implemented.

Optionally, the number of the infrared sensors disposed at the corners of the diagonals of the LGP in the television and on the side(s) without the light bars or disposed at the corners of the light bars and along the diagonal of the LGP in the television is two.

Optionally, the number of the infrared sensors disposed at corners on the shell of the television corresponding to the corners of a display screen is two, three or four.

Thus, in a case in which the infrared sensors are disposed at corners on the shell of the television, four infrared sensors are required to realize an accurate detections, by the television, for rotation angle of the remote controller, the position to which the remote controller points, the angle between the pointing-direction of the remote controller and the screen of the television, and the distance between the remote controller and the screen of the television. Of course, depending on actual requirements, it can also realize the detection for the position to which the remote controller points via the television by disposing two or three infrared sensors.

Optionally, the spot generated by the infrared sensors is a right-angle spot.

Thus, in a case in which the spot generated by the infrared sensor is the right-angle spot, only two infrared sensors are required to realize the accurate detections, by the television, for the rotation angle of the remote controller, the position to which the remote controller points, the angle between the pointing-direction of the remote controller and the screen of the television, and the distance between the remote controller and the screen of the television.

Optionally, the infrared sensor is an infrared light emitting diode (LED).

Thus, it is easy and simple in actual applications by utilizing the infrared LEDs as light emitting sensing devices of the infrared sensors.

The embodiments of the present disclosure further provide a television system including a television and a remote controller, the remote controller comprises:

an image collection unit configured to collect an image of preset infrared sensors on the television and image the collected image to a preset plane as a standard image, in a case in which the remote controller does not rotate with respect to the television; and to collect an image of the infrared sensors on the television and image the collected image to the preset plane again, in a case in which the remote controller rotates with respect to the television;

a calculation unit configured to calculate a rotation angle in a case in which the remote controller rotates with respect to a screen of the television by comparing the image with the standard image; and a transmitting unit configured to transmit the rotation angle calculated by the calculation unit to the television, the television comprises:

a receiving unit configured to receive the rotation angle transmitted from the transmitting unit of the remote controller.

With the television system provided in the embodiments of the present disclosure, the rotation angle in a case in which the remote controller rotates with respect to the screen of the television can be calculated easily, and the detection for the rotation angle of the remote controller with respect to the television is realized, which can indicate a rotation operation in a game easily.

Optionally, the infrared sensors are disposed at corners of diagonals of a light-guide plate (LGP) in the television and on the side(s) without light bar(s); or disposed at corners of the light bars and along the diagonal of the LGP in the television; or disposed at corners on the shell of the television corresponding to the corners of the display screen.

Optionally, the number of the infrared sensors disposed at the corners of the diagonals of the LGP in the television and on the side(s) without light bar(s) or disposed at the corners of the light bars and along the diagonal of the LGP in the television is two.

Optionally, the number of the infrared sensors disposed at corners on the shell of the television corresponding to the corners of a display screen is two, three or four.

Optionally, the spot generated by the infrared sensors is a right-angle spot.

Optionally, the infrared sensors is infrared light emitting diodes (LEDs).

DETAILED DESCRIPTION

Embodiments of the present disclosure provide a method for detecting a rotation angle of a remote controller in a television system and the television system, in order to realize a detection for the rotation angle of the remote controller with respect to the television, which extends an application prospect of the television system.

Detailed explanations for solutions provided in the embodiments of the present disclosure would be stated thereafter.

Figure 1:
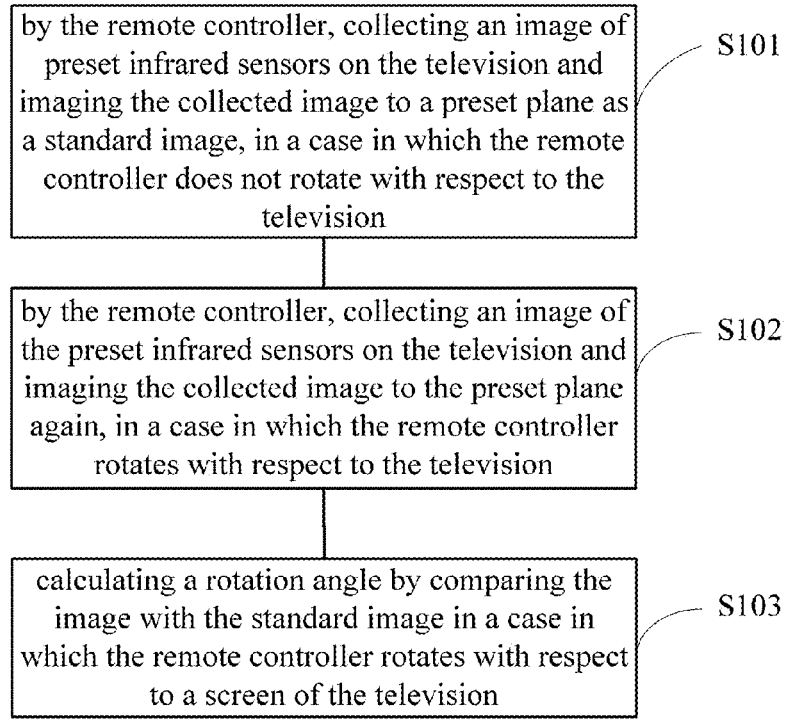
FIG. 1 is a flowchart illustrating a method for detecting a rotation angle of a remote controller in a television system provided in embodiments of the present disclosure.

As illustrated in FIG. 1, the embodiments of the present disclosure provides a method for detecting a rotation angle of a remote controller in a television system, including a television and the remote controller, the method comprises:

S101, by the remote controller, collecting an image of preset infrared sensors on the television and images the collected image to a preset plane as a standard image, in a case in which the remote controller does not rotate with respect to the television;

S102, by the remote controller, collecting an image of the infrared sensors on the television and images the collected image to the preset plane again, in a case in which the remote controller rotates with respect to the television; and S103, calculating a rotation angle in a case in which the remote controller rotates with respect to a screen of the television by comparing the image with the standard image.

Optionally, the remote controller transmits the imaged image to the television, the television compares the image with the standard image and calculates the rotation angle of the remote controller with respect to the screen of the television.

Optionally, the remote controller compares the image with the standard image and calculates the rotation angle of the remote controller with respect to the television.

Optionally, the method further comprises:

the remote controller transmits the obtained rotation angle to the television.

Optionally, the preset infrared sensors on the television comprise:

infrared sensors arranged on the side(s) without a light bar and at corners of a diagonal of a light-guide plate (LGP) in the television; or infrared sensors disposed at the corners of a light bar and along a diagonal of the LGP in the television; or infrared sensors arranged at corners on a shell of the television corresponding to the corners of a display screen.

Optionally, the number of the infrared sensors arranged on the side(s) without a light bar and at corners of the diagonal of a light-guide plate (LGP) in the television or disposed at the corners of a light bar and along a diagonal of the LGP in the television is two. The number of the infrared sensors disposed at corners on the shell of the television corresponding to the corners of a display screen is two, three or four.

Figure 2:
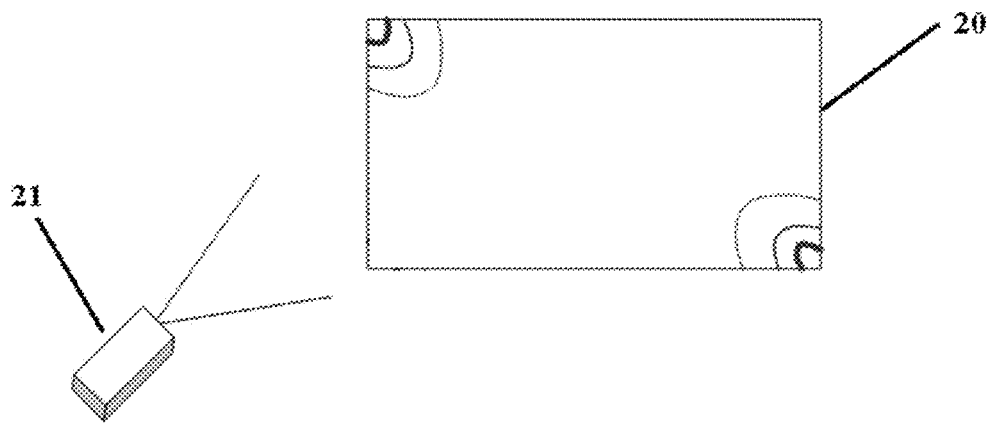
FIG. 2 is an exemplary view illustrating a structure of a television system provided in the embodiments of the present disclosure.
Figure 3:
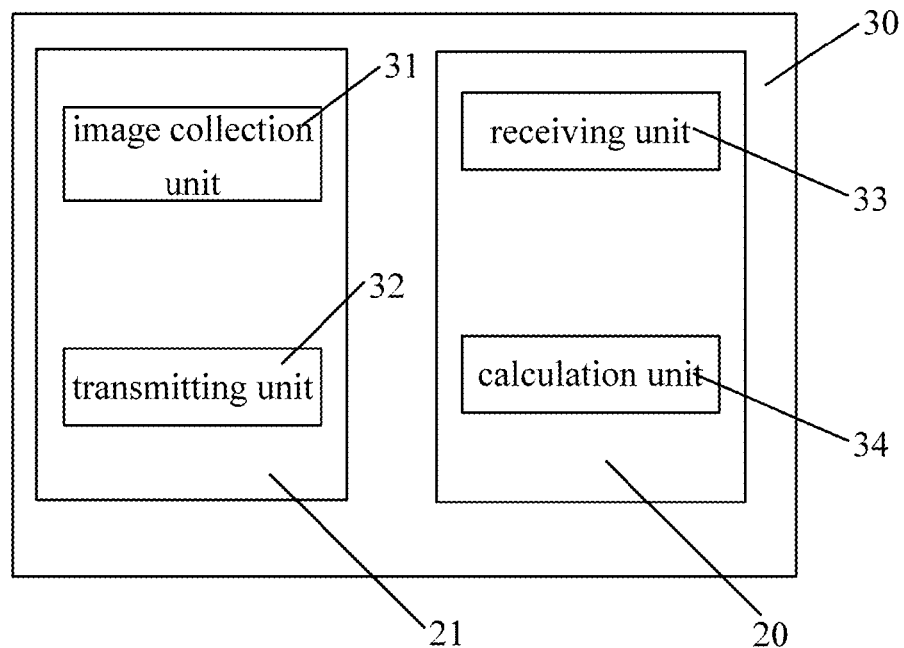
FIG. 3 is an exemplary view illustrating component modules of the television system provided in the embodiments of the present disclosure.

As illustrated in FIG. 2, the embodiments of the present disclosure further provide a television system including a television 20 and a remote controller 21, and as illustrated in FIG. 3, the remote controller 21 in the television system 30 comprises:

an image collection unit 31 configured to collect an image of preset infrared sensors on the television and image the collected image to a preset plane as a standard image, in a case in which the remote controller does not rotate with respect to the television; and to collect an image of the infrared sensors on the television and image the collected image to the preset plane again, in a case in which the remote controller rotates with respect to the television; and a transmitting unit 32 configured to transmit the imaged image to the television;

the television 20 comprises:

a receiving unit 33 configured to receive the imaged image transmitted from the transmitting unit of the remote controller;

a calculation unit 34 configured to calculate a rotation angle in a case in which the remote controller rotates with respect to a screen of the television by comparing the image with the standard image.

Figure 4:
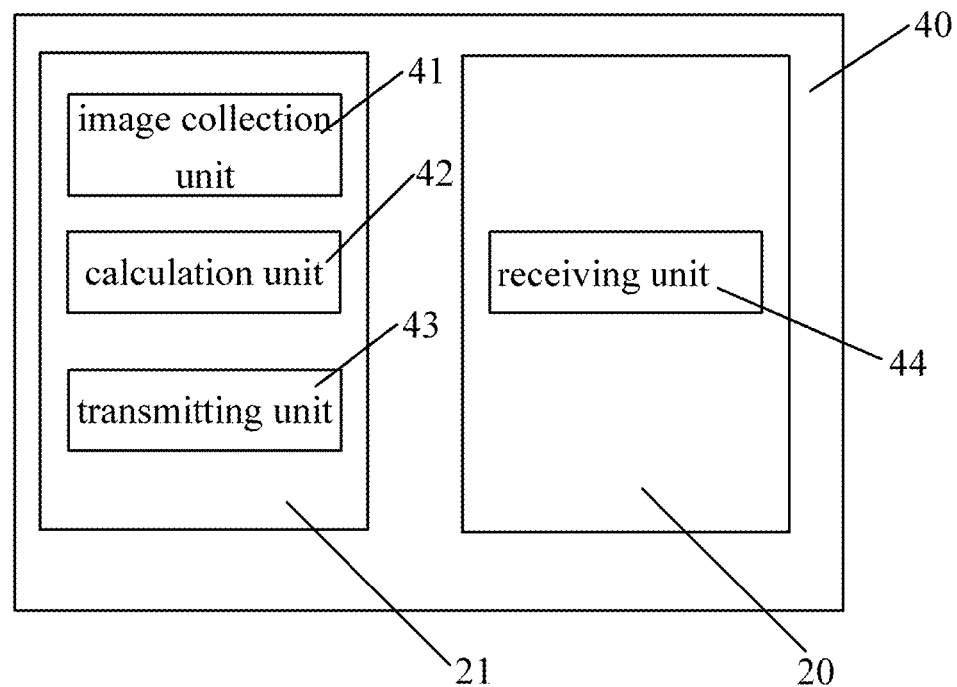
FIG. 4 is an exemplary view illustrating constitutional modules of another television system provided in the embodiments of the present disclosure.

As illustrated in FIG. 4, the embodiments of the present disclosure provide another television system including a television 20 and a remote controller 21, and the remote controller 21 in the television system 40 comprises:

an image collection unit 41 configured to collect an image of preset infrared sensors on the television and image the collected image to a preset plane as a standard image, in a case in which the remote controller does not rotate with respect to the television; and to collect an image of the infrared sensors on the television and image the collected image to the preset plane again, in a case in which the remote controller rotates with respect to the television;

a calculation unit 42 configured to calculate a rotation angle in a case in which the remote controller rotates with respect to a screen of the television by comparing the image with the standard image; and a transmitting unit 43 configured to transmit the rotation angle calculated by the calculation unit to the television, the television 20 comprises:

a receiving unit 44 configured to receive the rotation angle transmitted from the transmitting unit of the remote controller.

In an example, the image collection unit in the remote controller provided in the embodiments of the present disclosure is a high speed infrared camera, and of course the image collection unit can also be a Charge Coupled Device (CCD), namely a CCD image sensor.

Optionally, the infrared sensors are disposed in one way of the following: on the side(s) without a light bar and at corners of diagonals of a light-guide plate (LGP) in the television; at the corners of a light bar and along a diagonal of the LGP in the television; at corners on a shell of the television corresponding to the corners of a display screen.

Optionally, the infrared sensor is an infrared light emitting diode (LED).

Figure 5:
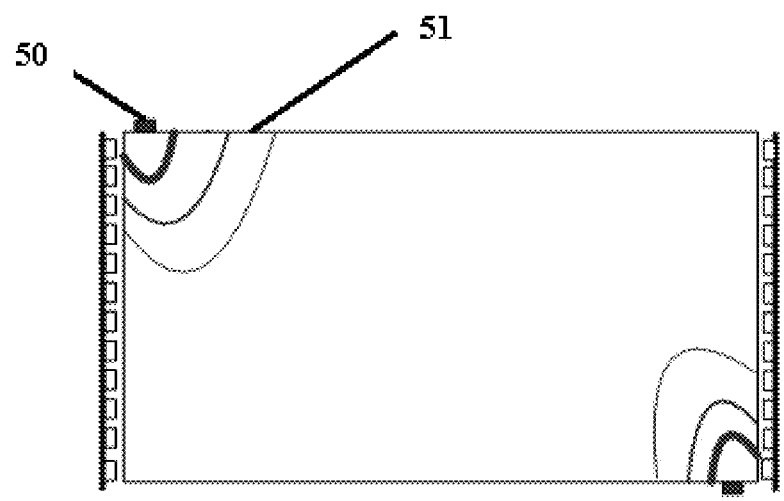
FIG. 5 is an exemplary view illustrating a case where infrared LEDs are disposed at corners of a diagonal of a light-guide plate (LGP) in the television in the television system and on a side without a light bar according to the embodiments of the present disclosure.

As illustrated in FIG. 5, the infrared LEDs 50 are disposed at corners of a diagonal of the light-guide plate (LGP) in the television and on the side(s) without a light bar, and correspondingly a distribution of infrared spot generated by the infrared LEDs 50 is denoted as 51. The number of the infrared LEDs 50 is illustrated as two in FIG. 5, but of course one or two infrared LEDs 50 can be disposed at corners of the other diagonal of the light-guide plate (LGP) in the television and on the side(s) without a light bar. That is to say, in an embodiment of the present disclosure, the number of the infrared sensors 50 disposed at corners of the diagonals of the light-guide plate (LGP) in the television and on the side(s) without a light bar can be two, three or four.

Figure 6:
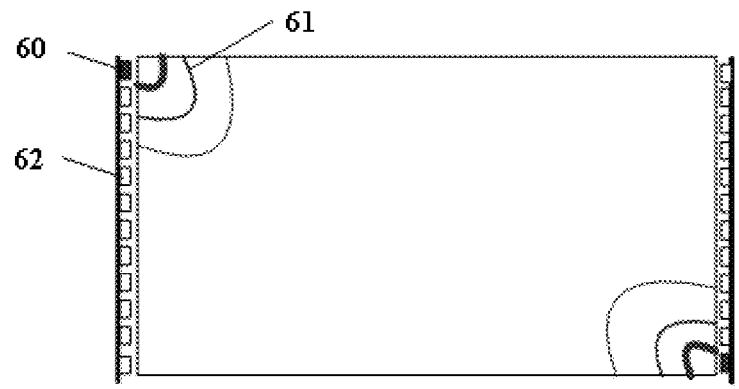
FIG. 6 is an exemplary view illustrating a case where the infrared LEDs are disposed at corners of the light bars and along the diagonal of the LGP in the television in the television system provided in the embodiments of the present disclosure.
Figure 7:
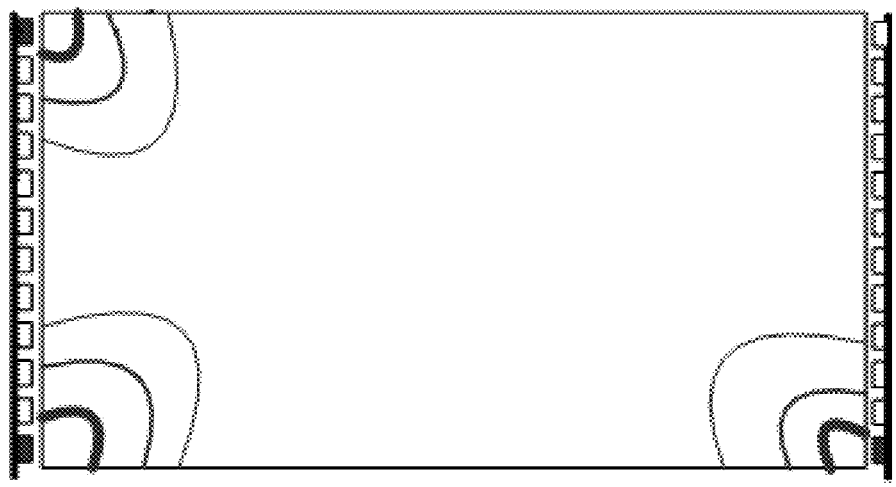
FIG. 7 is an exemplary view illustrating another case where the infrared LEDs are disposed at corners of the light bars and along the diagonal of the LGP in the television in the television system provided in the embodiments of the present disclosure.

As illustrated in FIG. 6, the infrared LEDs 60 are disposed at the corners of a light bar and along a diagonal of the LGP in the television. By taking the case where the infrared LEDs are disposed at corners of a LED light bar and along the diagonal of the light-guide plate (LGP) in the television as an example, other LEDs 62 in the LED light bar are all white LEDs 62, while the distribution of the infrared spot generated by the infrared LED 60 is denoted as 61. The number of the infrared LEDs 60 is illustrated as two in FIG. 6, but, of course, another one or two infrared LEDs 60 can be disposed at corners of a LED light bar and along the other diagonal of the light-guide plate (LGP) in the television, as illustrated in FIG. 7. FIG. 7 illustrates three infrared LEDs located at corners of LED light bars and along the diagonals of the light-guide plate (LGP) in the television as well as a distribution of the infrared spots generated by the infrared LEDs. That is to say, the number of the infrared LEDs disposed at corners of the diagonals of the light-guide plate (LGP) in the television and on the side(s) with a LED light bar, provided in the embodiments of the present disclosure, can be two, three or four.

Figure 8:
FIG. 8 is an exemplary view illustrating a case where the infrared LEDs are disposed at corners on a shell of the television corresponding to the corners of a display screen in the television system provided in the embodiments of the present disclosure.

As illustrated in FIG. 8, the infrared LEDs 80 are disposed at corners on a shell of the television.

In the embodiments of the present disclosure, the infrared LEDs are disposed in one way of the follows: at corners of a diagonal of the light-guide plate (LGP) in the television and on the side(s) without a light bar; at corners of a LED light bar and along a diagonal of the light-guide plate (LGP) in the television; or at the corners on the shell of the television, therefore the remote controller can exactly detect a size of a display area for the television according to the infrared spots generated by the infrared LEDs.

Optionally, the number of the infrared LEDs disposed at the corners on the shell of the television is two, three or four. The television only can detect the position to which the remote controller points in a case in which the number of the infrared LEDs located at the corners on the shell of the television is two or three; and four infrared LEDs are required to be disposed at the corners on the shell of the television, if it is needed to detect the rotation angle of the remote controller, the angle between the pointing-direction of the remote controller and the screen of the television and the distance between the remote controller and the screen of the television.

It should be noted that the number of the infrared LEDs located at corners of a diagonal of the light-guide plate (LGP) in the television and on the side(s) o without a light bar or at corners of a LED light bar and along a diagonal of the light-guide plate (LGP) in the television; or at the corners on the shell of the television, are not limited to two, three or four as illustrated in the embodiments of the present disclosure, and more infrared LEDs can also be disposed depending on the actual requirements.

Optionally, the spot generated by the infrared LED, disposed at corners of a diagonal of the light-guide plate (LGP) in the television and on the side(s) without a light bar; at corners of a LED light bar and along a diagonal of the light-guide plate (LGP) in the television, is a right-angle spot, and positions of four points can be determined from a two-point spot of the right-angle spot and no contour line of the spot is required to be calculated.

Optionally, the television is a liquid crystal television.

A calculation process of the calculation unit in the remote controller would be explained below in details, which would be described by taking a case where the infrared LEDs are located at corners of a diagonal of the light-guide plate (LGP) in the television and on the side(s) without a light bar or at corners of a LED light bar and along a diagonal of the light-guide plate (LGP) in the television, and the number of the infrared LEDs are two as an example.

Figure 9:
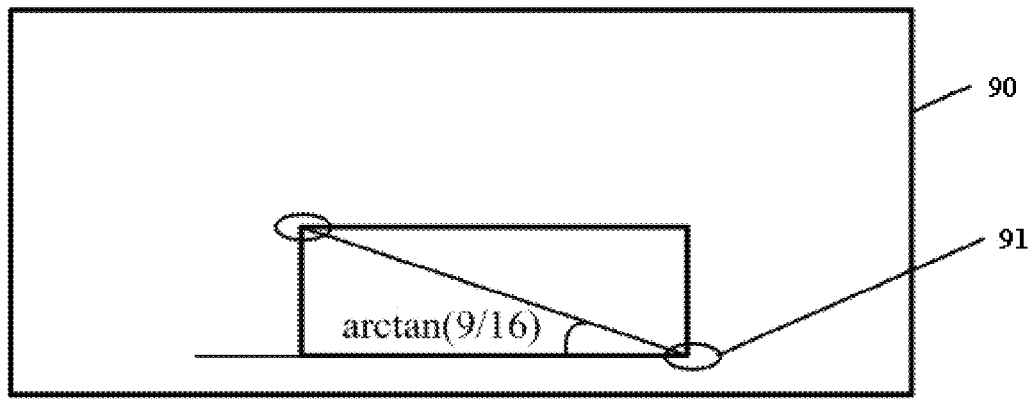
FIG. 9(*a*) and FIG. 9(*b*) are exemplary views illustrating a scheme for calculating the rotation angle of the remote controller by a calculation unit in the television system provided in the embodiments of the present disclosure.
Figure 9:
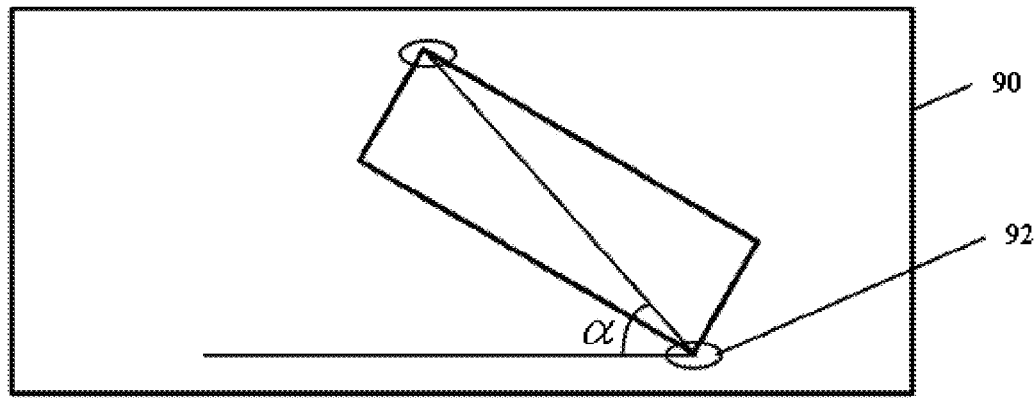

A calculation process for calculating the rotation angle of the remote controller is as follows. As illustrated in FIGS. 9(a) and 9(b), an area 90 represents a preset plane area for the remote controller. In a case in which the remote controller does not rotate with respect to the television, as illustrated in FIG. 9(a), a spot area of the infrared LEDs in the preset plane area 90 is represented as 91, and since the remote controller does not rotate at this time, an angle between a diagonal of the spot area 91 and a horizontal line of the preset plane area 90 is equal to an angle between the horizon and a diagonal of the infrared spots actually located at corners of a diagonal of the light-guide plate (LGP) in the television and on the side(s) without a light bar, or an angle between the horizon and a diagonal of the infrared spots actually at corners of a diagonal of the light-guide plate (LGP) in the television and on the side(s) with a LED light bar, while a physical direction of the angle between the horizon and the diagonal of the infrared spots, located at corners of a diagonal of the light-guide plate (LGP) in the television and on the side(s) without a light bar, or the angle between the horizon and a diagonal of the infrared spots, at corners of a diagonal of the light-guide plate (LGP) in the television and on the side(s) with a LED light bar, is fixed, for example, a fixed angle is arctan(9/16). In a case in which the remote controller rotates with respect to the television, as illustrated in FIG. 9(b), a spot area of the infrared LEDs in the preset plane area 90 is represented as 92 at this time, and a angle between the diagonal of the spot area 92 of the infrared LEDs in the preset plane area 90 and the horizontal line of the preset plane area 90 is a; therefore the calculation unit in the remote controller can easily calculate the rotation angle of the remote controller with respect to the television is $\theta=\alpha$-arctan(9/16).

Furthermore, the calculation unit in the remote controller provided by the implementation of the present disclosure can also calculate the position to which the remote controller points, the distance between the remote controller and the television, and a pointing-direction angle of the remote controller. This calculation process of the calculation unit in the remote controller would be explained below in details, which would be described by taking the case where the infrared LEDs provided in the implementations of the disclosure are disposed at corners of a diagonal of the light-guide plate (LGP) in the television and on the side(s) without a light bar or at corners of a diagonal of the light-guide plate (LGP) in the television and on the side(s) with a LED light bar and the number of the infrared LEDs are two as an example again.

Figure 10:
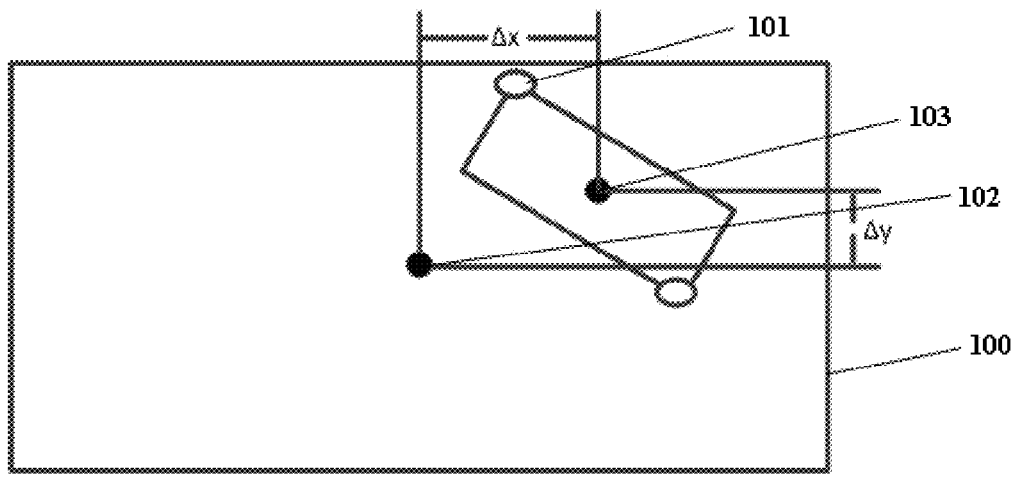
FIG. 10 is an exemplary view illustrating a scheme for calculating a position to which the remote controller points by the calculation unit in the television system provided in the embodiments of the present disclosure.

The processing for calculating the pointing-direction of the remote controller is as follows. As illustrated in FIG. 10, an area 100 represents a preset plane area for the remote controller, 101 represents a spot area of the infrared LEDs in the preset plane area 100, wherein a centre point 102 is a centre position of the preset plane area 100, and a midpoint 103 is a centre position on a diagonal of the spot area 101 of the infrared LEDs. The midpoint of the diagonal of the spot area of the infrared LEDs is the actual centre of the television, and therefore the position to which the remote controller points can be calculated by calculating a relative position between the midpoint 103 on the diagonal of the spot and the centre point 102 of the preset plane area 100. For example, if the relative position between the middle point 103 on the diagonal of the spot and the centre point 102 of the preset plane area 100 is as follows: $\Delta x=A$; $\Delta y=B$ (in a unit of number of pixels, and A is positive if the centre point 102 is on the left of the centre of the television, and is negative otherwise, while B is positive if the centre point 102 is above the centre of the television, and is negative otherwise), given that the length and width of a projection of the remote controller on the preset plane area 100 are pixels (M, N) and a resolution of the television is a*b, with the upper left corner of the image as the origin, an coordinate of the position to which the remote controller points on the screen of the television is (a/2-A/M*a, b/2-B/N*b).

A process for calculating the distance between the remote controller and the television is as follows. A physical length of the connection line of the diagonal of the spot of the infrared LEDs is fixed, for example, the number of pixels of the diagonal in the spot area of the infrared LEDs on the preset plane area for the remote controller is denoted as m, and the number of pixels of the diagonal in the spot area of the infrared LEDs on the preset plane area is denoted as M, in a case in which the distance between the remote controller, as it is horizontal, and the television is 1 meter, the distance between the remote controller and the television is d=M/m based on relationships between similar triangles.

A process for calculating the angle between the pointing-direction of the remote controller and the screen of the television, that is, the pointing-direction angle of the remote controller, is as follows. In a case in which the spot generated by the infrared LEDs is the right-angle spot, positions of four corners at the display area of the television can be acquired directly without calculating the contour line of the spot. Further, if the spot generated by the infrared LEDs is not the right-angle spot, the positions of the four corners at the display area of the television can be defined with the contour line of the spot, and the pointing-direction angle of the remote controller with respect to the screen can be calculated according to relative positions of the four corner points at the display area of the television in the preset plane area for the remote controller. Given coordinates of the four corner points at the display area of the television are (x1, y1), (x2, y2), (x3, y3) and (x4, y4), respectively, then:

a vertical angle between the remote controller and the plane where the television is located is 90°-arctan((x1-x2)/(x3-x4)); and a horizontal angle between the remote controller and the plane where the television is located is 90°-arctan((y1-y2)/(y3-y4)).

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present disclosure. Thus, the protection scope of the present invention is defined by the claims.

This application claims priority to a Chinese Patent Application No. 201310752960.9, filed on Dec. 21, 2013, with the China's State Intellectual Property Office, the disclosure of which is incorporated by reference herein as a whole.

What is claimed is:

1. A method for detecting a rotation angle of a remote controller in a television system including a television and the remote controller, wherein the method comprises:
    collecting, by the remote controller, an image of preset infrared sensors on the television and imaging the collected image to a preset plane as a standard image, in a case in which the remote controller does not rotate with respect to the television;
    collecting, by the remote controller, an image of the infrared sensors on the television and imaging the collected image to the preset plane again, in a case in which the remote controller rotates with respect to the television; and
    calculating a rotation angle in a case in which the remote controller rotates with respect to a screen of the television by comparing the image with the standard image.

2. The method of claim 1, wherein the remote controller transmits the imaged image to the television, the television compares the image with the standard image and calculates the rotation angle in a case in which the remote controller rotates with respect to the screen of the television.

3. The method of claim 1, wherein the remote controller compares the image with the standard image and calculates the rotation angle in a case in which the remote controller rotates with respect to the screen of the television.

4. The method of claim 3, wherein the method further comprises:

transmitting, by the remote controller, the obtained rotation angle to the television.

5. The method of claim 1, wherein the preset infrared sensors on the television comprise:
infrared sensors disposed at corners of a diagonal of a light-guide plate (LGP) in the television and on a side without a light bar; or
infrared sensors disposed at corners of a light bar and along a diagonal of the LGP in the television; or
infrared sensors disposed at corners on a shell of the television corresponding to corners of a display screen.

6. The method of claim 5, wherein the number of the infrared sensors, disposed at the corners of the diagonal of the LGP in the television and on the side without the light bar or disposed at the corners of the light bar and along the diagonal of the LGP in the television, is two.

7. The method of claim 5, wherein the number of the infrared sensors, disposed at corners on the shell of the television corresponding to the corners of the display screen, is two, three or four.

8. A television system including a television and a remote controller, wherein,
the remote controller comprises:
an image collection unit configured to collect an image of preset infrared sensors on the television and image the collected image to a preset plane as a standard image, in a case in which the remote controller does not rotate with respect to the television; and to collect an image of the infrared sensors on the television and image the collected image to the preset plane again, in a case in which the remote controller rotates with respect to the television; and
a transmitting unit configured to transmit the imaged image to the television,
the television comprises:
a receiving unit configured to receive the imaged image transmitted from the transmitting unit of the remote controller;
a calculation unit configured to calculate a rotation angle in a case in which the remote controller rotates with respect to a screen of the television by comparing the image with the standard image.

9. The television system of claim 8, wherein the infrared sensors are located at corners of a diagonal of a light-guide plate (LGP) in the television and on a side without a light bar; or located at corners of a light bar and along a diagonal of the LGP in the television; or disposed at corners on a shell of the television corresponding to the corners of a display screen.

10. The television system of claim 9, wherein the number of the infrared sensors, disposed at the corners of the diagonal of the LGP in the television and on the side without the light bar or disposed at the corners of the light bar and along the diagonal of the LGP in the television, is two.

11. The television system of claim 9, wherein the number of the infrared sensors, disposed at corners on the shell of the television corresponding to the corners of a display screen, is two, three or four.

12. The television system of claim 8, wherein the infrared sensors generate right-angle spots.

13. The television system of claim 8, wherein the infrared sensors are infrared light emitting diodes (LEDs).

14. A television system including a television and a remote controller, wherein,
the remote controller comprises:
an image collection unit configured to collect an image of preset infrared sensors on the television and image the collected image to a preset plane as a standard image, in a case in which the remote controller does not rotate with respect to the television; and to collect an image of the infrared sensors on the television and image the collected image to the preset plane again, in a case in which the remote controller rotates with respect to the television;
a calculation unit configured to calculate a rotation angle in a case in which the remote controller rotates with respect to a screen of the television by comparing the image with the standard image; and
a transmitting unit configured to transmit the rotation angle calculated by the calculation unit to the television,
the television comprises:
a receiving unit configured to receive the rotation angle transmitted from the transmitting unit of the remote controller.

15. The television system of claim 14, wherein the infrared sensors are located at corners of a diagonal of a light-guide plate LGP in the television and on a side without a light bar; or located at corners of a light bar and along a diagonal of the LGP in the television; or located at corners on a shell of the television corresponding to corners of a display screen.

16. The television system of claim 15, wherein the number of the infrared sensors, disposed at the corners of the diagonal of the LGP in the television and on the side without the light bar or disposed at the corners of the light bar and along the diagonal of the LGP in the television, is two.

17. The television system of claim 15, wherein the number of the infrared sensors, disposed at corners on the shell of the television corresponding to the corners of the display screen, is two, three or four.

18. The television system of claim 14, wherein the infrared sensors generate right-angle spots.

19. The television system of claim 14, wherein the infrared sensors are infrared light emitting diodes (LEDs).

20. The method of claim 1, wherein the infrared sensors generate right-angle spots.

* * * * *